Patented Dec. 7, 1926.

1,609,416

UNITED STATES PATENT OFFICE.

POOLE MAYNARD, OF ATLANTA, GEORGIA.

METHOD OF MAKING BRICK AND OTHER BURNED-CLAY PRODUCTS.

No Drawing.   Application filed March 8, 1926.  Serial No. 93,355.

This invention relates to methods of making brick and other burned clay products and more particularly to methods of making buff or light colored bricks and other burned clay products.

In most sections of the country no clays are readily available from which buff or yellow colored bricks may be manufactured to meet the demand.

The yellowish or buff color of burned clay wares is due to the iron oxide present in the clay and is obtained by burning the clay in an oxidizing atmosphere at a temperature above 2000° F. Thus a clay containing from one to two per cent of iron oxide may give a cream or buff color when burned in the ordinary manner. This color due to iron oxide may be markedly affected by other substances present in the clay. Thus some clays carrying up to two per cent in iron oxide with a high content of alumina may burn to yellow or buff colors, and other clays having a higher iron content as much as that and one-half per cent or even more, and carrying a high percentage of alumina may burn to yellows and buffs. This apparent bleaching effect of alumina upon the iron is not so marked or reliable as that of lime.

Clays containing approximately two and one-half to three and one-half per cent of iron oxide with lime present in about three times this quantity produce upon burning under the required conditions, iron and lime compounds, which although possibly very complex in nature, give very reliable color effects. I have found that mixtures of clays and other materials when made to approximate these quantities of iron and lime and burned in an oxidizing atmosphere above 2000° F. give very uniform and reliable color effects in yellows and buffs.

This lime may be obtained from several different sources. Limestone or its directly manufactured products may be used, but seem to restrict the range of burning by shortening the temperature limits between incipient vitrification and viscosity. Lime feldspars could be used to advantage, but these deposits are widely scattered and wholly undeveloped.

I have found that the lime available in blast furnace slag, which is a cheap waste product is particularly suitable for use in practicing the process. When blast furnace slag is employed it produces a good bleach, is not subject to rapid softening at higher temperatures and also has no loss upon ignition.

The range of burning may be increased allowing better control of the color development in the kiln by the addition of a white refractory clay. This addition also aids in securing the proper proportions of iron oxide and lime.

In practicing the process an ordinary clay having a high iron oxide content is mixed with a refractory clay having a very low iron oxide content and blast furnace slag to obtain a mixture having a uniform iron oxide content of substantially three and one-half per cent and from nine to twenty-five per cent of lime in the burned product. This is based upon a theoretical fusion point ranging from 2550° to 2250° F. The brick formed from these mixes is placed in an ordinary brick kiln and burned in the usual manner. As stated, the iron oxide content may be varied and when the content is in the neighborhood of three per cent, not over thirteen per cent of lime is employed.

With the iron oxide content of the clay to be used in the neighborhood of nine per cent, substantially thirty-five per cent of common clay is employed in the mixture, forty-five per cent of refractory clay and twenty per cent of blast furnace slag. If the iron oxide content of the common clay varies the proportions are varied accordingly. A slight variation in proportion will not seriously affect the color or fusibility of the product.

In preparing the mixture the slag may be ground in a tube mill or like apparatus. The preparation of the refractory clay and the common clay will depend upon the plant process. They may be dried and ground separately or together. The refractory clay may be first calcined and then ground either in a mixture with the common clay and slag or individually. The clays may be ground either separately or together in a wet pan. After the material has been mixed so as to obtain a substantially uniform mixture the bricks are manufactured in the ordinary manner.

I am aware of the fact that molten slag has been cast into bricks and employed as a substitute for the ordinary clay brick, but such product is not the subject matter of the present invention and is specifically disclaimed.

While I have described in detail the preferred practice of my process, it is to be understood that the details of procedure and proportions of ingredients may be widely varied, and that known chemical equivalents may be employed in place of the materials mentioned, without departing from the spirit of the invention or the scope of the subjoined claims.

I claim:

1. The process of making brick and other burned clay products which comprises burning a mixture of clays to produce a product having an iron oxide content from two and one-half to three and one-half per cent and less than twenty-five per cent of lime at a temperature above 2000° F.

2. The process of making brick and other burned clay products which comprises forming a mixture of clays adding less than twenty-five per cent of lime and burning at a temperature above 2000° F. to obtain an iron oxide content of from two and one-half to three and one-half per cent in the burned product.

3. The process of making brick and other burned clay products which comprises forming a mixture of clays adding blast furnace slag in the proportion of less than twenty-five per cent and burning at a temperature of more than 2000° F. to obtain an iron oxide content of from two and one-half to three and one-half per cent in the burned product.

4. The process of making brick and other burned clay products which comprises forming a mixture of clays, adding blast furnace slag in the proportion of substantially twenty per cent of the entire mixture and burning at a temperature above 2000° F. to obtain an iron oxide content of from two and one-half to three and one-half per cent in the burned product.

5. The process of making brick and other burned clay products which comprises adding refractory clay to common clay, adding lime thereto in the proportion of less than twenty-five per cent, and burning at a temperature of more than 2000° F. to obtain a mixture having an iron content of from two and one-half to three and one-half per cent in the burned product.

6. The process of making brick and other burned clay products which comprises adding refractory clay to common clay, adding blast furnace slag thereto in the proportion of substantially twenty per cent of the entire mixture, and burning at a temperature above 2000° F. to obtain a mixture having an iron oxide content of from two and one half to three and one-half per cent in the burned product.

7. The process of making brick and other burned clay products which comprises burning a mixture of clays having an iron oxide content of substantially three and one-half per cent with substantially ten per cent of lime at a temperature above 2000° F.

8. The process of making brick and other burned clay products which comprises forming a mixture of clays, adding substantially ten per cent of lime, and burning at a temperature above 2000° F. to obtain an iron oxide content of substantially three and one-half per cent in the burned product.

9. The process of making brick and other burned clay products which comprises forming a mixture of clays, adding blast furnace slag in the proportion of substantially ten per cent, and burning at a temperature of above 2000° F. to obtain an iron oxide content of substantially three and one-half per cent in the burned product.

10. The process of making brick and other burned clay products which comprises adding refractory clay to common clay, adding lime thereto in the proportion of substantially ten per cent, and burning at a temperature above 2000° F. to obtain a mixture having an iron oxide content of substantially three and one-half per cent in the burned product.

In testimony whereof I affix my signature.

POOLE MAYNARD.